(12) United States Patent
Brunk

(10) Patent No.: US 6,833,851 B1
(45) Date of Patent: Dec. 21, 2004

(54) GPS RECEIVER AND DEPTH SOUNDER UNIT HAVING AN ADJUSTABLE DISPLAY SCREEN

(75) Inventor: Scott Brunk, Shawnee Mission, KS (US)

(73) Assignee: Garmin Corporation, Taipei (TW)

( * ) Notice: Subject to any disclaimer, the term of this patent is extended or adjusted under 35 U.S.C. 154(b) by 580 days.

(21) Appl. No.: 09/587,867

(22) Filed: Jun. 6, 2000

(51) Int. Cl.⁷ .................................................. G09G 5/00
(52) U.S. Cl. ........................ 345/798; 701/23; 701/200; 345/799; 345/800; 345/801
(58) Field of Search .............................. 701/23–26, 21, 701/200–226; 345/788–801; 342/357.09; 367/6, 133

(56) References Cited

U.S. PATENT DOCUMENTS

| | | | | |
|---|---|---|---|---|
| 5,119,341 A | * | 6/1992 | Youngberg | 367/5 |
| 5,187,978 A | * | 2/1993 | Tendler | 73/187 |
| 5,267,042 A | * | 11/1993 | Tsuchiya et al. | 348/239 |
| 5,303,204 A | * | 4/1994 | Wertsberger | 367/99 |
| 5,319,376 A | * | 6/1994 | Eninger | 342/357.09 |
| 5,331,602 A | * | 7/1994 | McLaren | 367/6 |
| 5,343,395 A | * | 8/1994 | Watts | 701/16 |
| 5,543,714 A | * | 8/1996 | Blanpain et al. | 324/345 |
| 5,579,285 A | * | 11/1996 | Hubert | 367/133 |
| 5,615,114 A | * | 3/1997 | Nordin | 702/5 |
| 5,699,244 A | * | 12/1997 | Clark et al. | 702/2 |
| 5,786,849 A | * | 7/1998 | Lynde | 348/113 |
| 5,883,817 A | * | 3/1999 | Chisholm et al. | 703/1 |
| 5,956,032 A | * | 9/1999 | Argiolas | 345/798 |
| 6,011,551 A | | 1/2000 | Amro | |
| 6,021,092 A | * | 2/2000 | Paffenholz et al. | 367/24 |
| 6,163,503 A | * | 12/2000 | Gudbjornsson | 367/6 |
| 6,333,488 B1 | * | 12/2001 | Lawrence et al. | 219/121.84 |
| 6,381,538 B1 | * | 4/2002 | Robinson et al. | 701/211 |
| 6,469,664 B1 | * | 10/2002 | Michaelson et al. | 342/357.13 |
| 6,520,102 B1 | * | 2/2003 | Johnson | 114/44 |

OTHER PUBLICATIONS

Microsoft Word 2000, 1999, pp. 1–2.*

* cited by examiner

Primary Examiner—Kristine Kincaid
Assistant Examiner—Le Nguyen
(74) Attorney, Agent, or Firm—Hovey Williams LLP

(57) ABSTRACT

A navigational device (10) having a display screen (14) that simultaneously displays two different sets of information and that permits an operator to selectively and smoothly adjust the portion of the display screen (14) that is devoted to each of the sets of information.

10 Claims, 3 Drawing Sheets

GPS RECEIVER AND DEPTH SOUNDER UNIT HAVING AN ADJUSTABLE DISPLAY SCREEN

BACKGROUND OF THE INVENTION

1. Field of the Invention

The present invention relates to navigational devices. More particularly, the invention relates to a combined GPS receiver and depth sounder unit that includes a single display screen that can be smoothly adjusted so that the area of the display screen devoted to a GPS map can be changed relative to the area devoted to a depth sounder display.

2. Description of the Prior Art

Many types of navigational devices exist for both recreational and professional use. For example, many fishermen, boaters, and other sportsmen use GPS receivers to determine and view their current location and depth sounders to determine the depth of a body of water.

Recently, GPS receivers and depth sounders have been combined in single units to permit users to determine both their current location and the depth of a body of water. These combined units typically include a single display screen that displays both a GPS map display and a depth sounder display.

Combined GPS receivers and depth sounder units allocate a fixed amount of their display screens for the GPS map display and the depth sounder display, for example, approximately 75% for the GPS map and approximately 25% for the depth sounder display. This fixed division of the display screen is a limitation because users may wish to adjust the relative size of the GPS map and depth sounder displays in certain circumstances. For example, a fisherman who is primarily interested in determining and viewing the depth of a body of water may wish to enlarge the depth sounder display relative to the GPS map display to provide more resolution for the depth display.

OBJECTS AND SUMMARY OF THE INVENTION

The present invention solves the above-described problems and provides a distinct advance in the art of navigational devices. More particularly, the present invention provides a navigational device with a single display screen that simultaneously displays two different sets of information and that permits an operator to selectively adjust the portion of the display screen that is devoted to each of the sets of information.

In one preferred embodiment, the navigational device is a combined GPS receiver and depth sounder unit that includes a first input port for receiving a sensor signal from a depth sounder transducer; a second input port for receiving a location signal; a display screen including a first display area for displaying information corresponding to the sensor signal and a second display area for displaying information corresponding to the location signal; and a computing device coupled with the display screen. The computing device is programmed to permit a viewer to selectively adjust the size of the first and second display areas relative to one another to change the relative portion of the display screen that is occupied by the first and second display areas. This display adjustment is smooth (i.e., finely adjustable) so that a viewer can select any number of different sizes for the first and second display areas within the limits of the overall size of the display screen and the resolution of the screen.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

Figure 1:
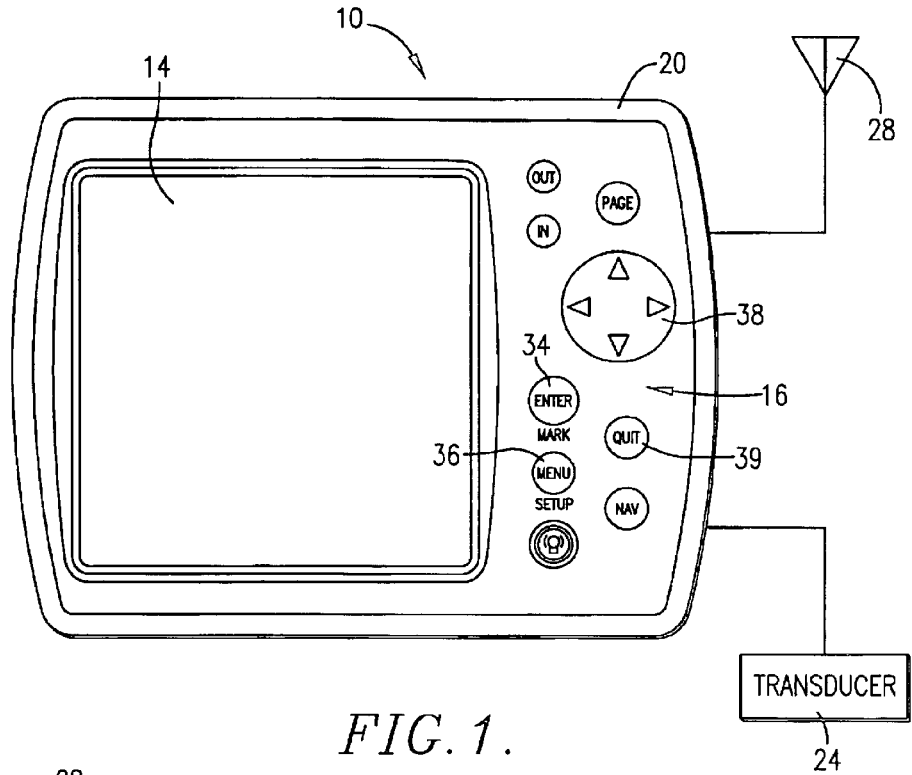
FIG. 1 is an elevational view of a GPS receiver and depth sounder unit constructed in accordance with a preferred embodiment of the present invention and shown connected to a depth sounder transducer and an antenna.
Figure 2:
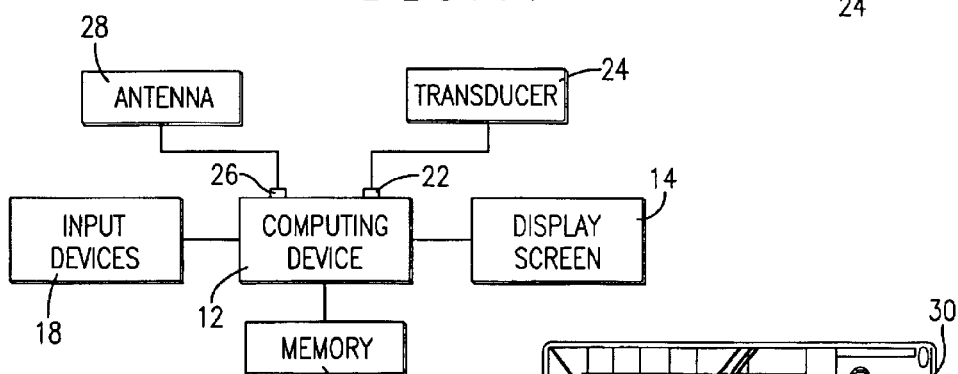
FIG. 2 is a block diagram depicting several of the components of the combined GPS receiver and depth sounder unit of FIG. 1.
Figure 3:
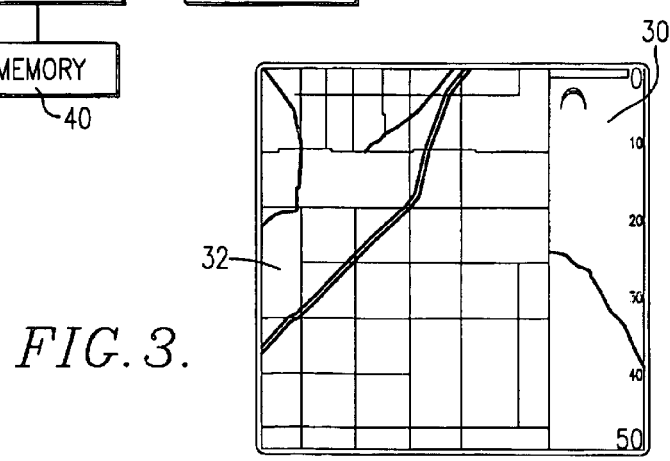
FIG. 3 is a screen display showing the simultaneous display of a GPS map display and a depth sounder display on the unit.

Turning now to the drawing figures, and particularly FIGS. 1 and 2, a combined GPS receiver and depth sounder unit 10 constructed in accordance with a preferred embodiment of the invention is illustrated. The unit is operable for determining and displaying both GPS location information and depth information for a body of water and broadly includes a computing device 12, a display screen 14, one or more input devices 16, and memory 18 all housed in or on an outer housing 20.

In more detail, the computing device 12 is provided for controlling operation of the other components of the unit as described herein in response to information received from external sensors and antennas. In one preferred embodiment, the computing device 12 is coupled with a first input port 22 that in turn may be coupled with a sonic-type depth transducer 24. The depth transducer generates sensor signals representative of the depth of a body of water and transmits the signals to the computing device 12. The computing device 12 analyzes the sensor signals and, together with other conventional electronics in the unit 10, displays information on the display screen 14 relating to the sensor signals.

The computing device 12 is also preferably coupled with a second input port 26 that in turn may be coupled with an antenna 28. The antenna receives location signals such as GPS signals representative of the location of the unit from GPS satellites and delivers the signals to the computing device 12. The computing device 12 analyzes the location signals and, together with other conventional electronics in the unit 10, displays information on the display screen 14 relating to the location signals.

The display screen 14 is coupled with the computing device 12 for displaying information relating to the signals received from the transducer 24 and the antenna 28. In one preferred embodiment of the invention, the display screen simultaneously displays a depth sounder display in a first area 30 of the display screen and a GPS map in a second area 32 of the display screen. In another embodiment, the unit 10 may be dedicated to depth sounder capabilities only and display a regular sized depth sounder display in the first display area 30 and an enlarged or zoomed depth sounder display in the second display area 32. The display is preferably a liquid crystal display (LCD).

The input devices 16 are coupled with the computing device 12 and are provided for operating the unit 10 in a conventional manner and for permitting an operator to adjust the size of the first and second display areas 30, 32 of the display screen 14 as described in more detail below. The input devices 16 preferably include an Enter key 34, a Menu key 36, a Scrolling key 38, a Quit or Escape key 39, and several other keys found on conventional GPS receiver and depth sounder units such as the GPS 162 unit mentioned above.

In accordance with one important aspect of the present invention, the computing device 12 is programmed to permit a viewer to selectively and smoothly adjust the relative size of the first and second display areas 30, 32 of the display screen 14 to any number of different sizes within the limits of the overall size and resolution of the display screen. For example, a user may wish to enlarge the depth sounder display relative to the GPS map display to improve the detail and/or resolution of the depth sounder display. The computer program that performs this function may be implemented in firmware or stored in memory 40 accessible by the computing device. The computer program is preferably written in C, but may be written in any computer language as a matter of design choice.

Figure 4:
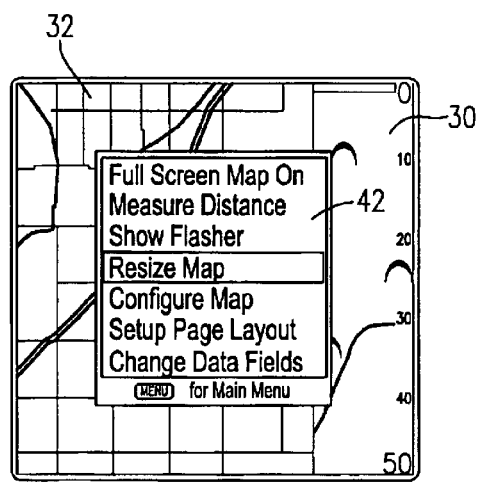
FIG. 4 is a screen display illustrating a first step in the method of resizing the GPS map display and the depth sounder display.

A user first initiates the screen adjustment feature of the present invention by pressing the Menu key 36 on the front of the unit 10. The computing device 12 then displays a menu box 42 over the GPS map and the depth sounder display as depicted in FIG. 4. The user may then select to resize the map by selecting this option from the menu.

Figure 5:
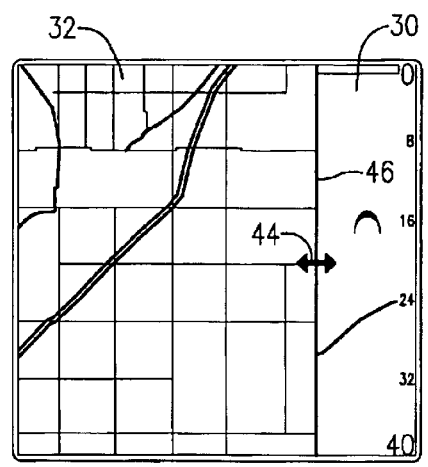
FIG. 5 is a screen display illustrating a second step in the method of resizing the GPS map display and the depth sounder display.
Figure 6:
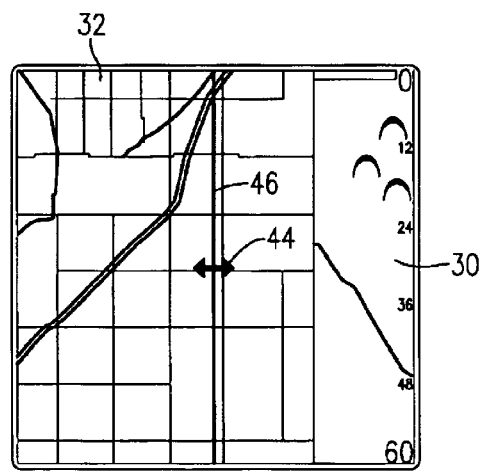
FIG. 6 is a screen display illustrating a third step in the method of resizing the GPS map display and the depth sounder display.
Figure 7:
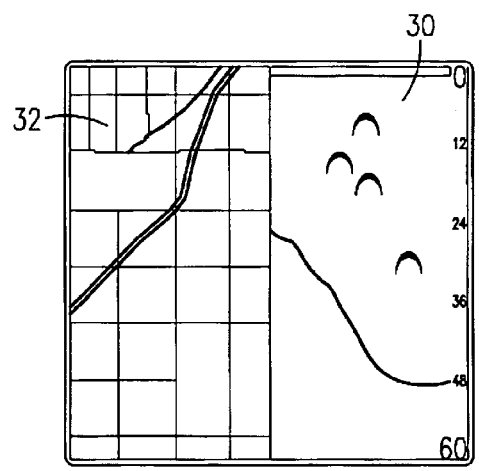
FIG. 7 is a screen display illustrating a fourth step in the method of resizing the GPS map display and the depth sounder display.

When the user selects the Resize Map option, a cursor 44 and bold line 46 are displayed over the boundary between the first and second display areas 30, 32 as depicted in FIG. 5. The user may then adjust the relative size of the two display areas by pressing either the left or right arrow on the Scrolling key 38. For example, if the user wishes to increase the size of the depth sounder display relative to the GPS map display, the user would push the left arrow on the Scrolling key 38. This causes the cursor 44 and bold line 46 to move to the left as illustrated in FIG. 6. Once the user has moved the cursor 44 and bold line 46 to a preferred location, the computing device 12 reallocates the portion of the display screen 14 that is devoted to the first and second display areas 30, 32 as depicted in FIG. 7 and resizes the GPS map and depth sounder display to fit their respective display areas.

Figure 8:
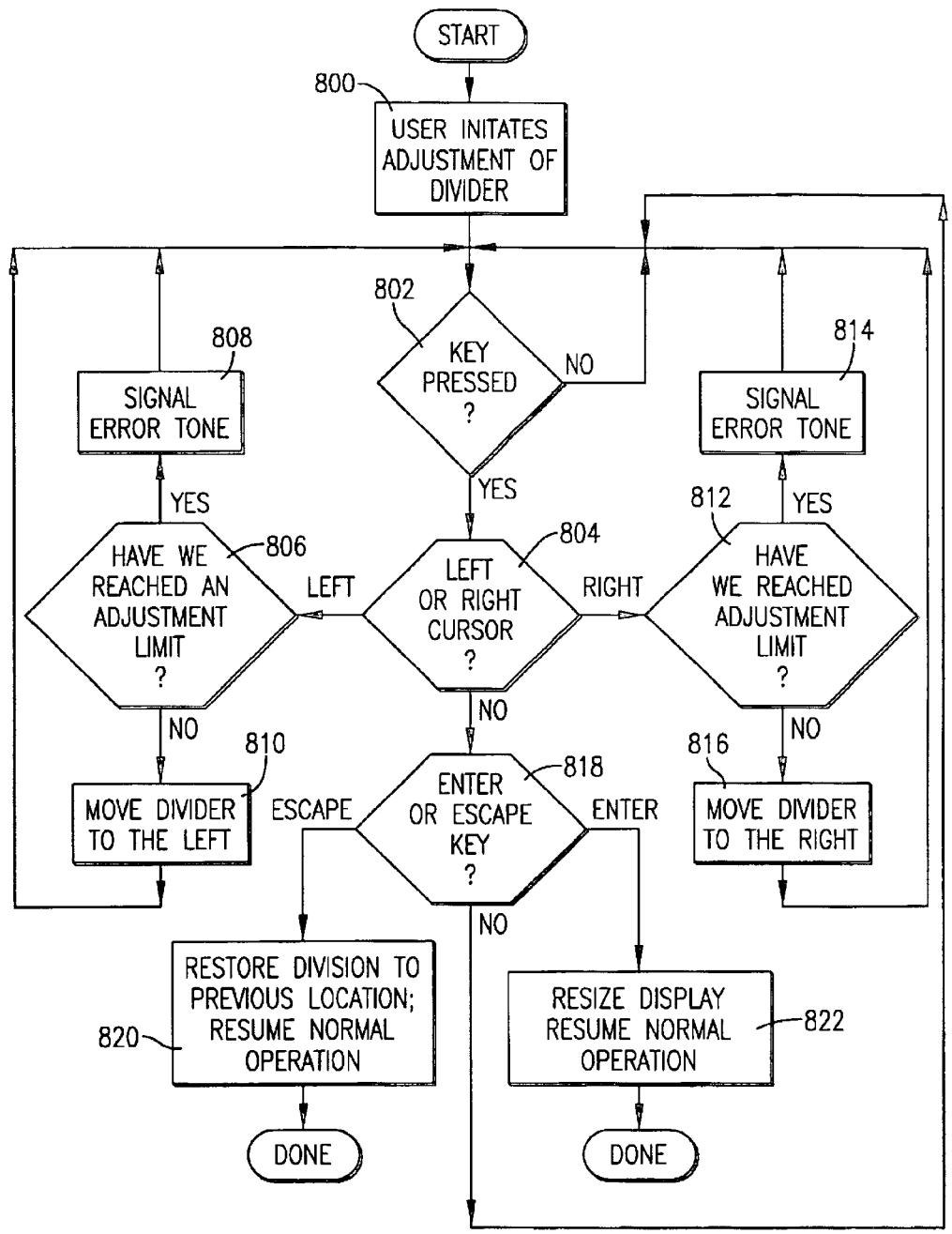
FIG. 8 is a flow diagram illustrating certain steps performed by a computer program that is used to resize the displays.

FIG. 8 is a flow diagram depicting the steps performed by the computer program during the screen display resizing process described above. The screen resizing portion of the computer program begins when a user initiates the resizing function as depicted in step 800. The computer program then waits for the user to press the Scrolling key 38 as depicted in step 802 and continues to loop through step 802 until the key is pushed.

The computer program next determines whether the left or right cursor 44 on the Scrolling key 38 is pressed as depicted in step 804. If the left cursor is pressed, the program determines whether a left adjustment limit has been reached in step 806. The adjustment limits are preprogrammed size limits for the two display areas 30, 32. For example, in one preferred embodiment of the invention, the second display area 32 devoted to the GPS map display occupies at least 50%, but no more than 75%, of the display screen. Conversely, the first display area 30 devoted to the depth sounder display occupies at least 25%, but no more than 50% of the display screen.

If an adjustment limit has been reached in step 806, the computer program causes the unit 10 to generate an error tone or signal as depicted in step 808. However, if an adjustment limit has not been reached, the computer program moves the boundary or divider between the two display areas 30, 32 to the left as depicted in step 808 and then returns to step 802 to wait for further screen adjustments.

If the user presses the right cursor in step 804, steps 812, 814, and 816 perform the same functions as steps 806, 808, and 810, except that the divider or boundary is moved to the right.

Once the user stops moving the cursor to the left or right, step 818 of the computer program waits for the user to either press the Enter key 34 or the Escape key 39. If the user presses the Escape key, the computer program restores the screen division to the previous location and then resumes normal operation. However, if the user presses the Enter key, the computer program resizes the display screen according to the new position of the divider or boundary as depicted in step 822.

From the foregoing description of a preferred embodiment of the present invention, one skilled in the art will appreciate that the present invention offers an advance in the art of navigational devices by providing such a device with a single display screen that simultaneously displays two different sets of information and that permits an operator to selectively adjust the portion of the display screen that is devoted to each of the sets of information. The navigational device of the present invention permits a smooth adjustment of the display areas of the display screen so that an operator may adjust the sizes of the display areas limited only by the overall size and resolution of the display screen.

Although the invention has been described with reference to the preferred embodiment illustrated in the attached drawing figures, it is noted that equivalents may be employed and substitutions made herein without departing from the scope of the invention as recited in the claims. For example, although the preferred embodiment of the present invention is implemented on a combined GPS receiver and depth sounder unit, it may be used with other navigational devices including a dedicated depth sounder unit that includes a display screen having a first display area for a regularly sized depth sounder display and a second display area for an enlarged or zoomed depth sounder display.

Having thus described the preferred embodiment of the invention, what is claimed as new and desired to be protected by Letters Patent includes the following:

1. A navigational and marine system comprising:
   a sonic transducer for sensing a depth of a body of water and for generating a depth signal representative thereof:
   a GPS antenna for sensing GPS satellite signals;
   a display screen;
   a computing device coupled with the sonic transducer, the GPS antenna, and the display for receiving the depth signal from the sonic transducer, receiving the GPS satellite signals from the GPS antenna and for determining a location of the system as a function thereof, driving the display so as to display information corresponding to the depth signal on a first display area of the display and to display information corresponding to the location of the system on a second display area of the display;

a scrolling key coupled with the computing device, the scrolling key and the computing device permitting a user to selectively adjust a relative portion of the display screen occupied by the first display area and the second display area; and a single housing for housing the display screen, computing device, and the scrolling key.

2. The navigational device as set forth in claim 1, wherein each display area is constrained as to the relative portion of the display screen that it may occupy according to a left adjustment limit and a right adjustment limit.

3. The navigational device as set forth in claim 1, wherein the first display area may occupy between twenty-five and fifty percent of the display screen.

4. The navigational device as set forth in claim 1, wherein the second display area may occupy between fifty and seventy-five percent of the display screen.

5. The navigational device as set forth in claim 2, wherein the computing device is further operable to check input received from the viewer against the adjustment limits and generate an error signal when one of the adjustment limits has been exceeded.

6. The navigational device as set forth in claim 1, wherein the first display area occupies a right side of the display and the second display area occupies a left side of the display.

7. The navigational device as set forth in claim 6, wherein the scrolling key includes a left-facing arrow which may be depressed for enlarging the first display area of the display and a right-facing arrow which may be depressed to enlarge the second display area of the display.

8. A navigational and marine system comprising:

a sensor for sensing a sensed condition and for generating a sensor signal representative thereof;

a GPS antenna for sensing GPS satellite signals;

a display screen;

a computing device coupled with the sensor, the GPS antenna, and the display for
receiving the sensor signal from the sensor,
receiving the GPS satellite signals from the GPS antenna and for determining a location of the system as a function thereof,
driving the display so as to display information corresponding to the sensor signal on a first display area of the display and to display information corresponding to the location of the system on a second display area of the display; and a scrolling key coupled with the computing device, the input and the computing device permitting a user to selectively adjust a relative portion of the display screen occupied by the first display area and the second display area.

9. The navigational and marine system as set forth in claim 8, further including a single housing far housing the display screen, the computing device, and the input.

10. The navigational and marine system as set forth in claim 8, wherein the sensor in a sonic transducer for sensing a depth of a body of water and wherein the sensor signal is a depth signal.

\* \* \* \* \*